(12) United States Patent
Stirbu et al.

(10) Patent No.: US 9,773,345 B2
(45) Date of Patent: Sep. 26, 2017

(54) METHOD AND APPARATUS FOR GENERATING A VIRTUAL ENVIRONMENT FOR CONTROLLING ONE OR MORE ELECTRONIC DEVICES

(75) Inventors: Vlad Alexandru Stirbu, Tampere (FI);
David Joseph Murphy, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 29 days.

(21) Appl. No.: 13/397,259

(22) Filed: Feb. 15, 2012

(65) Prior Publication Data

US 2013/0207963 A1    Aug. 15, 2013

(51) Int. Cl.
| | |
|---|---|
| *G06T 15/00* | (2011.01) |
| *G06T 19/00* | (2011.01) |
| *G06F 3/01* | (2006.01) |
| *G06F 3/0481* | (2013.01) |
| *G06F 3/0484* | (2013.01) |

(52) U.S. Cl.
CPC .............. *G06T 19/00* (2013.01); *G06F 3/011* (2013.01); *G06F 3/04815* (2013.01); *G06F 3/04847* (2013.01)

(58) Field of Classification Search
CPC .... G06F 3/038; G06F 3/04815; G06F 3/0488; G06T 19/006; G06T 19/003
USPC .......... 345/7–9, 419, 629–641; 715/773, 848
See application file for complete search history.

(56) References Cited

U.S. PATENT DOCUMENTS

| | | | |
|---|---|---|---|
| 2003/0020707 A1* | 1/2003 | Kangas et al. ................ 345/418 |
| 2009/0295791 A1* | 12/2009 | Aguera y Arcas ... G06T 15/205 |
| | | | 345/419 |
| 2010/0070902 A1* | 3/2010 | De Los Reyes ... H04N 21/6377 |
| | | | 715/771 |
| 2010/0134338 A1* | 6/2010 | Belz et al. .................... 341/176 |
| 2010/0313146 A1 | 12/2010 | Nielsen et al. |

(Continued)

FOREIGN PATENT DOCUMENTS

| | | |
|---|---|---|
| WO | 2008112148 A1 | 9/2008 |
| WO | 2010025559 A1 | 3/2010 |

OTHER PUBLICATIONS

Han, Jinsoo, et al. "User-friendly home automation based on 3D virtual world." Consumer Electronics, IEEE Transactions on 56.3 (2010): 1843-1847.*
Han, Jinsoo, et al. "User-friendly home automation based on 3D virtual world." Consumer Electronics (ICCE), 2010 Digest of Technical Papers International Conference on. IEEE, 2010.*

(Continued)

*Primary Examiner* — Andrew G Yang
(74) *Attorney, Agent, or Firm* — Ditthavong & Steiner, P.C.

(57) ABSTRACT

An approach is provided for generating a virtual environment for controlling one or more electronic devices. A mapping platform causes, at least in part, a rendering of a user interface depicting a virtual environment comprising one or more representations of one or more devices, one or more accessory devices associated with the one or more devices, or a combination thereof. The mapping platform then determines one or more interactions with the user interface, the virtual environment, the one or more representations, or a combination thereof. Further, the mapping platform processes and/or facilitates a processing of the one or more interactions to cause, at least in part, a controlling of the one or more devices, the one or more accessory devices, or a combination thereof.

20 Claims, 8 Drawing Sheets

(56) References Cited

U.S. PATENT DOCUMENTS

| | | | | |
|---|---|---|---|---|
| 2011/0061100 | A1* | 3/2011 | Mattila | G06F 3/017 726/17 |
| 2011/0138317 | A1 | 6/2011 | Kang et al. | |
| 2011/0138416 | A1* | 6/2011 | Kang | G06F 3/0482 725/39 |
| 2011/0254861 | A1* | 10/2011 | Emura et al. | 345/633 |
| 2011/0302535 | A1* | 12/2011 | Clerc | G06F 3/017 715/848 |
| 2012/0019858 | A1* | 1/2012 | Sato | 358/1.15 |
| 2012/0105447 | A1 | 5/2012 | Kim | |
| 2012/0113140 | A1* | 5/2012 | Hilliges et al. | 345/633 |
| 2012/0119888 | A1 | 5/2012 | Reeves et al. | |

OTHER PUBLICATIONS

IEEE Xplore—Abstract Page, A combined mixed reality and networked home approach to improving user interaction with consumer electronics, http://ieeexplore.ieee.org/xpls/abs_all.jsp?arnumber=5735494&tag=1, Accessed: Jun. 22, 2012.

Logitech Harmony® Remotes—Choose your Harmony, http://www.logitech.com/en-us/remotes/universal-remotes, Accessed: Jun. 22, 2012.

Psiloc irRemote S60, http://irremote.psiloc.com, Accessed: Jun. 22, 2012.

Notification of Transmittal of The International Search Report and The Written Opinion of The International Searching Authority, or The Declaration for International Application No. PCT/FI2013/050145, dated May 7, 2013, pp. 1-17.

J. Han et al., "User-Friendly Home Automation Based on 3D Virtual World," Conference Publication, Published in IEEE Transactions on Consumer Electronics, New York, dated Aug. 1, 2010, vol. 56, pp. 1843-1847.

J. Lee et al., "A Unified Remote Console Based on Augmented Reality in a Home Network Environment", Conference Publication, Published in IEEE International Conference on Consumer Electronics, Las Vegas, USA, dated Jan. 10, 2007, pp. 1-2.

Y. Su et al., "HouseGenie: Universal Monitor and Controller of Networked Devices on Touchscreen Phone in Smart Home", Conference Publication, Published in IEEE Ubiquitous Intelligence & Computing and 7th International Conference on Autonomic & Trusted Computing, Piscataway, USA, dated Oct. 26, 2010, pp. 487-489.

K. Wang et al., "3D Virtual Interface for Ubiquitous Intelligent Environments", Conference Publication, Published in 3rd IET Conference on Intelligent Environments, Ulm, Germany, dated Sep. 24, 2007, pp. 268-275.

T. Seifried et al., "CRISTAL: A Collaborative Home Media and Device Controller Based on a Multi-Touch Display," Conference Publication, Published in ACM International Conference on Interactive Tabletops and Surfaces, Banff, Canada, dated Nov. 23, 2009, pp. 33-40.

* cited by examiner

METHOD AND APPARATUS FOR GENERATING A VIRTUAL ENVIRONMENT FOR CONTROLLING ONE OR MORE ELECTRONIC DEVICES

BACKGROUND

Service providers and device manufacturers (e.g., wireless, cellular, etc.) are continually challenged to deliver value and convenience to consumers by, for example, providing compelling network services. One area of interest has been the development of virtual environments representing the real world (e.g., NOKIA CITY SCENE and GOOGLE STREET VIEW). Virtual environments can enable users to interact and explore environments and their workings in ways that may be difficult in real-world situations due to cost, time, resources, etc. (e.g., touring a number of cities in a single hour). The same concepts are also beginning to be applied to interior spaces. For example, augmented reality tracking is progressing to the point where users of mobile devices (e.g., mobile phones) are often able to track the maintenance or installation instructions of consumer electronics and appliances in their homes. However, enabling users to interact with various electronic devices (e.g., smart devices such as consumer electronics, major appliances, heating, ventilation, and air conditioning (HVAC) units, etc.) with a single device (e.g., a control device) has been difficult because the various electronic devices are often designed with features intended to differentiate themselves from other devices. Therefore, service providers and device manufacturers face significant technical challenges in providing a service that allows users to control various electronic devices using a single user interface.

Some Example Embodiments

Therefore, there is a need for an approach for generating a virtual environment for controlling one or more electronic devices.

According to one embodiment, a method comprises processing and/or facilitating a processing of one or more panoramic images to cause, at least in part, a segmentation of at least one object from the one or more panoramic images. The method also comprises determining one or more animations associated with the at least one object. The method further comprises causing, at least in part, a rendering of the one or more panoramic images with the one or more animations substituting for the at least one object.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more panoramic images to cause, at least in part, a segmentation of at least one object from the one or more panoramic images. The apparatus is also caused to determine one or more animations associated with the at least one object. The apparatus is further caused to cause, at least in part, a rendering of the one or more panoramic images with the one or more animations substituting for the at least one object.

According to another embodiment, a computer-readable storage medium carries one or more sequences of one or more instructions which, when executed by one or more processors, cause, at least in part, an apparatus to process and/or facilitate a processing of one or more panoramic images to cause, at least in part, a segmentation of at least one object from the one or more panoramic images. The apparatus is also caused to determine one or more animations associated with the at least one object. The apparatus is further caused to cause, at least in part, a rendering of the one or more panoramic images with the one or more animations substituting for the at least one object.

According to another embodiment, an apparatus comprises means for processing and/or facilitating a processing of one or more panoramic images to cause, at least in part, a segmentation of at least one object from the one or more panoramic images. The apparatus also comprises means for determining one or more animations associated with the at least one object. The apparatus further comprises means for causing, at least in part, a rendering of the one or more panoramic images with the one or more animations substituting for the at least one object.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating a virtual environment for controlling one or more electronic devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
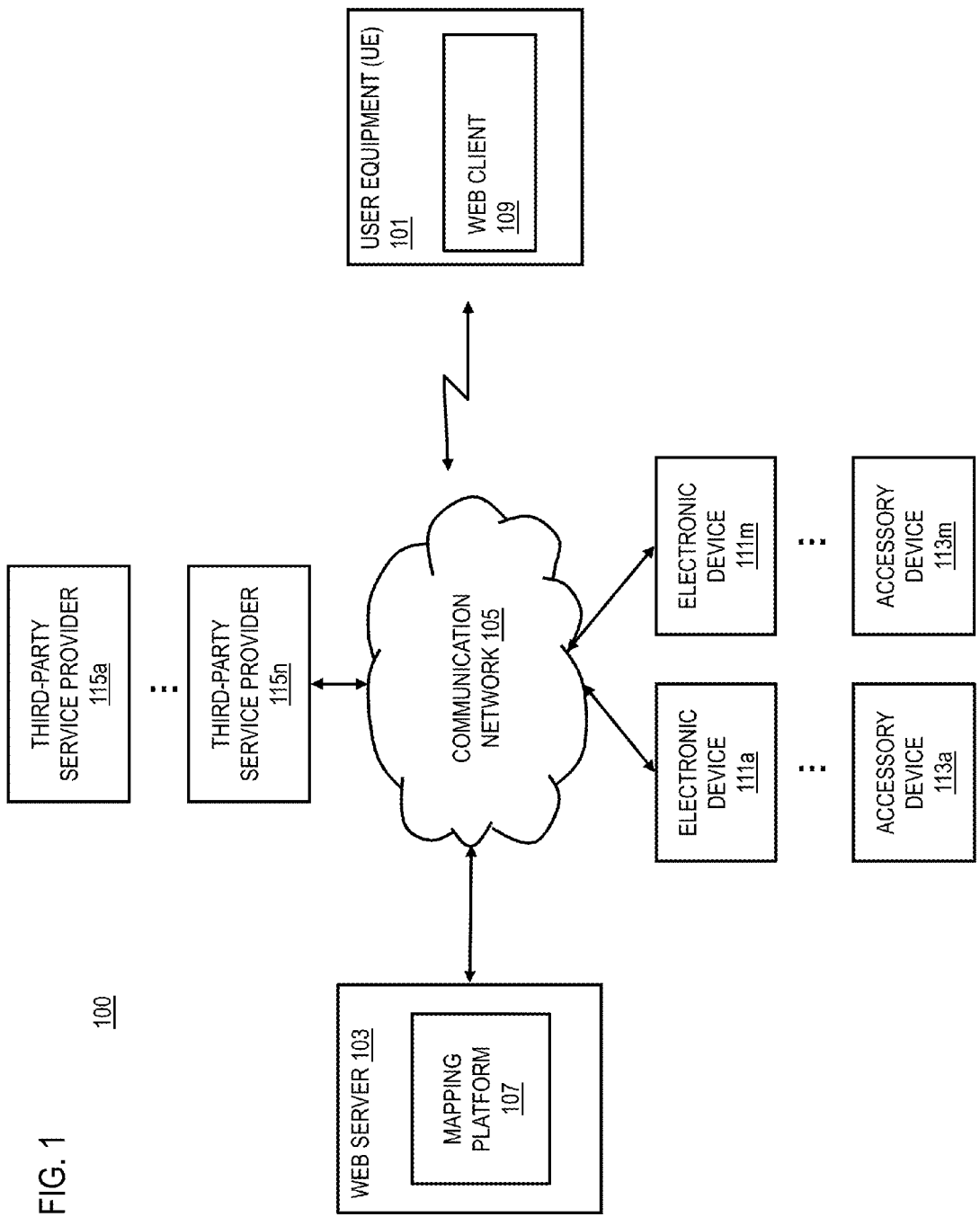
FIG. 1 is a diagram of a system capable of generating a virtual environment for controlling one or more electronic devices, according to one embodiment.

FIG. 1 is a diagram of a system capable of generating a virtual environment for controlling one or more electronic devices, according to one embodiment. The development of virtual environments has enabled users to interact and explore environments and their workings in ways that may be difficult in real-world situations due to cost, time, resources, etc. Virtual environments can now be developed for interior spaces (e.g., a home or office). More specifically, three-dimensional small-scale environments can be generated using one or more images in connection with one or more modeling techniques such as three-dimensional point cloud models, cylindrical projection models, manually inputted mapping models, or a combination thereof. In addition, augmented reality tracking is progressing to the point where users of mobile devices (e.g., mobile phones) are often able to track the maintenance or installation instructions of consumer electronics and appliances in their homes. However, controlling a wide variety of electronic devices (e.g., smart devices such as consumer electronics, major appliances, heating, ventilation, and air conditioning (HVAC) units, etc.) with a single device (e.g., a control device) has proved difficult because these devices are often designed with featured intended to differentiate themselves from other devices. More specifically, services providers and device manufactures face significant technical challenges in providing a way to create a user-friendly mapping of the physical devices to a control device, particularly if there are many electronic devices located within an interior space. In addition, mapping the controls of the physical devices to a control device is also challenging because of the different interfaces on a physical remote control and a control device (e.g., a graphic user interface application). As a result of the numerous differences and potential incompatibilities, an end user is likely to experience an unwanted cognitive load.

To address this problem, a system 100 of FIG. 1 introduces the capability to generate a virtual environment for controlling one or more electronic devices. In one embodiment, the system 100 causes a rendering of a user interface in a mobile device (e.g., a mobile phone) depicting a virtual environment that represents a real-world environment (e.g., a home) including one or more three-dimensional models of one or more electronic devices (e.g., network controllable smart devices such as Universal Plug and Play (UPnP) devices) and one or more accessory devices (e.g., a remote control) associated with the one or more electronic devices. In one embodiment, the system 100 constructs the virtual environment based on one or more images of the real-world environment (e.g., one or more images captured with a mobile device). The system 100 can then determine the presence of one or more electronic devices, the one or more accessory devices, or a combination thereof and their locations within the real-world environment based on the one or more images. In one embodiment, the system 100 then causes a rendering of one or more representations of the one or more electronic devices, the one or more accessory devices, or a combination thereof in the user interface based on their locations as depicted in the one or more images. In one embodiment, the system 100 can also determine one or more locations of at least one user in the real-world environment and then determine to render the virtual environment, at least one portion of the virtual environment (e.g., a living room), or a combination thereof in the user interface based on the one or more locations of the at least one user.

In another embodiment, the system 100 can determine metadata associated with the one or more electronic devices, the one or more accessory devices, or a combination thereof located in the real-world environment, which the system 100 can then use to perform one or more location queries. The results of the one or more location queries enable the system 100 to retrieve information related to the one or more electronic devices located in a target area (e.g., a living room). More specifically, the metadata associated with the one or more electronic devices can convey information to the system 100 about the location of the one or more electronic devices, using either geometric coordinates or symbolic coordinates, as well as linked references to one or more third-party service providers (e.g., a device manufacturer) in order to obtain one or more three-dimensional models of the one or more electronic devices, the one or more accessory devices, or a combination thereof. In one embodiment, the system 100 can process all of this information in order to cause a rendering of the virtual environment, a portion of the virtual environment (e.g., a living room), or a combination thereof.

In one embodiment, the system 100 determines the one or more representations of the one or more electronic devices, the one or more accessory devices, or a combination thereof based on three-dimensional models supplied by one or more third-party service providers (e.g., one or more device manufacturers). In another embodiment, the system 100 determines the one or more representations based on one or more three-dimensional models constructed by one or more users utilizing computer vision techniques. In either case, the system 100 determines the one or more representations based on one or more substantially physically accurate models (e.g., a visualization of the electronic device's control surface), one or more abstract models (e.g., an abstract visualization not tied to the physicality of the device), or a combination thereof. By way of example, the at least one visualization of the one or more control surfaces can be mapped to the same actions the physical remote is able to perform by one or more devices manufacturers prior to supplying the one or more three-dimensional models to the system 100. In another embodiment, the system 100 determines the mapping of the at least one visualization to the one or more control surfaces. Further, in one embodiment, the system 100 determines the status information associated with the one or more electronic devices, the one or more accessory devices, or a combination thereof and then causes a rendering of the one or more representations based on the status information. As a result, the one or more representations depict all of the elements of the real product and allow a user to interact within the virtual environment while the effects of the one or more interactions are experienced in the real world.

In one embodiment, the system 100 determines one or more interactions with the user interface, the virtual environment, the one or more electronic devices, the one or more accessory devices, or a combination thereof. More specifically, the one or more interactions determine the one or more electronic devices, the one or more accessory devices, or a combination thereof to be controlled by the system 100. In one embodiment, the system 100 determines the one or more interactions with respect to a user that (a) is located within the real-world; (b) has remote access to the user interface and the virtual environment; or (c) a combination thereof. By way of example, a user can explore a virtual environment (e.g., a home) by physically moving with the user interface in the real-world environment or by virtually moving through the virtual environment. In either case, when the user reaches the representation of the living room, he or she can determine the one or more electronic devices, the one or more accessory devices, or a combination thereof located in that particular room. By way of example, a user can select and then control with the user interface a Digital Living Network Alliance (DLNA)/UPnP enabled television set located in the room. More specifically, the system 100 renders the television and the related remote control in the user interface including one or more visualizations of the one or more control surfaces. In one embodiment, the system 100 enables the user to control the television either through one or more interactions with the control surfaces of television or through the control surfaces of the remote control. For example, if the user presses play on the representation of the remote control, a video will start to play on the television located in the real-world environment.

In one embodiment, the system 100 can also determine one or more queries for at least one location, at least one status, or a combination thereof of the one or more electronic devices, the one or more accessory devices, or a combination thereof. By way of example, a "which room is the television on"? query can cause the system 100 to render the virtual environment, a portion of the virtual environment (e.g., a living room), or a combination thereof in the user interface where the electronic device can be found in the real-world environment. In another embodiment, the system 100 can also render the quadrant of the virtual environment that the electronic device is located in if the indoor geographic information system (GIS) used to generate the virtual environment is accurate enough.

As shown in FIG. 1, the system 100 comprises a user equipment (UE) 101 having connectivity to a web server 103 via a communication network 105. The web server 103 contains a mapping platform 107 and the UE 101 contains a web client 109 (e.g., a web browser). The mapping platform 107 may exist in whole or in part within the web server 103, or independently. The UE 101 and the web server 103 also have connectivity to one or more electronic devices 111*a*-111*m* (also collectively referred to as electronic devices 111), one or more related accessory devices 113*a*-113*m* (also collectively referred to as accessory devices 113), and one or more third-party service providers 115*a*-115*n* (e.g., one or more device manufacturers) (also collectively referred to as the third-party service providers 115) via the communication network 105. In one embodiment, the third-party service providers 115 may also have connectivity directly with the electronic devices 111, the accessory devices 113, or a combination thereof via the communication network 105.

In one embodiment, the mapping platform 107 causes a rendering of a user interface in the web client 109 of the UE 101 depicting a virtual environment that represents a real-world environment (e.g., a home or office) including one or more three-dimensional models of electronic devices 111 (e.g., a smart device such as a DLNA/UPnP enabled television) and accessory devices 113 (e.g., a remote control) associated with the electronic devices 111. In one embodiment, the mapping platform 107 constructs the virtual environment based on one or more images (e.g., one or more photographs taken with the UE 101) of the real-world environment. In addition, the mapping platform 107 can determine the presence of electronic devices 111, accessory devices 113, or a combination thereof and their locations within the real-world environment based on the one or more images. The mapping platform 107 can then cause a rendering of the electronic devices 111, the accessory devices 113, or a combination thereof in the virtual environment based on their locations as depicted in the one or more images. In addition, the mapping platform 107 can determine one or more locations of at least one user in the real-world environment and then determine to render the virtual environment, at least one portion of the virtual environment (e.g., a living room), or a combination thereof based on the one or more locations of the at least one user.

In another embodiment, the mapping platform 107 can determine metadata associated with the electronic devices 111 located in the real-world environment and then create at least one index that allows the mapping platform 107 to perform one or more location queries. The results of the one or more location queries enable the mapping platform 107 to retrieve information related to the electronic devices 111 located in a target area (e.g., a living room). More specifically, the metadata associated with the electronic devices 111 can convey information about the locations of the one or more electronic devices 111, using either geometric coordinates or symbolic coordinates, as well as linked references to one or more third-party service providers 115 in order to obtain one or more three-dimensional models of the electronic devices 111, the accessory devices 113, or a combination thereof. In one embodiment, the mapping platform 107 can process all of this information in order to cause a rendering of a virtual environment including the electronic devices 111, the accessory devices 113, or a combination thereof.

In one embodiment, the mapping platform 107 determines the one or more representations of the electronic devices 111, the accessory devices 113, or a combination thereof based on three-dimensional models supplied to the mapping platform 107 by one or more third-party service providers 115 (e.g., one or more device manufacturers) via the communication network 105. In another embodiment, the mapping platform 107 determines the one or more representations based on one or more three-dimensional models constructed by one or more users using computer vision techniques. In either case, the mapping platform 107 determines the one or more representations based on one or more substantially physically accurate models (e.g., at least one visualization of the control surface of the electronic devices 111), one or more abstract models (e.g., at least one abstract visualization not tied to the physicality of the device), or a combination thereof. By way of example, the at least one visualization of the one or more control surfaces can be mapped to the same actions the accessory device 113 is able to perform in the real-world environment by one or more third-party service providers 115. In another embodiment, the mapping platform 107 determines the mapping of the at least one visualization to the one or more control surfaces. Further, in one embodiment, the mapping platform 107 determines the status information associated with the electronic devices 111 (e.g., whether a television is on or off), the accessory devices 113, or a combination thereof and then causes a rendering of the one or more representations based on the status information. As a result, the one or more representations depict all the elements of the real product and allow a user to interact within the virtual environment while the effects of the one or more interactions are experienced in the real-world environment.

In one embodiment, the mapping platform 107 determines one or more interactions with the UE 101, the virtual environment, the electronic devices 111, the accessory devices 113, or a combination thereof. More specifically, the one or more interactions determine the electronic devices 111, the accessory devices 113, or a combination thereof to be controlled by the mapping platform 107. In one embodiment, the mapping platform 107 determines the one or more interactions with respect to a user that (a) is located within the real-world; (b) has remote access to the user interface and the virtual environment; or (c) a combination thereof. As previously discussed, in one use case example, a user can explore a virtual environment (e.g., a home) by physically moving in the real-world environment with a UE 101 or by virtually moving through the virtual environment. In either case, when the user reaches the representation of the living room, he or she can determine the electronic devices 111, the accessory devices 113, or a combination thereof located in that particular room. For example, the user can select and control with the UE 101 a DLNA/UPnP enabled television located in the living room. As a result, the mapping platform 107 renders one or more representations of the television and an accessory device (e.g., a remote control) including one or more visualizations of the one or more control surfaces. In one embodiment, the mapping platform 107 enables the user to control the television either through one or more interactions with the control surfaces of the television or the remote control. By way of example, if the user presses play on the representation of the remote control in the virtual environment, a video will start to play on the television located in the real-world environment.

In one embodiment, the mapping platform 107 can also determine a query for at least one location, at least one status, or a combination thereof of one or more electronic devices 111, one or more accessory devices 113, or a combination thereof. By way of example, a "which room is the television on"? query can cause the mapping platform 107 to render in the web client 109 of the UE 101 the virtual environment, a portion of the virtual environment (e.g., the living room), or a combination thereof where the electronic device 111 can be found in the real-world environment. In another embodiment, the mapping platform 107 can also render the specific quadrant of the virtual environment that the electronic device 111 is located in if the indoor GIS used to generate the virtual environment is accurate enough.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the web server 103, the mapping platform 107, the electronic devices 111, the accessory devices 113, and the third-party service providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
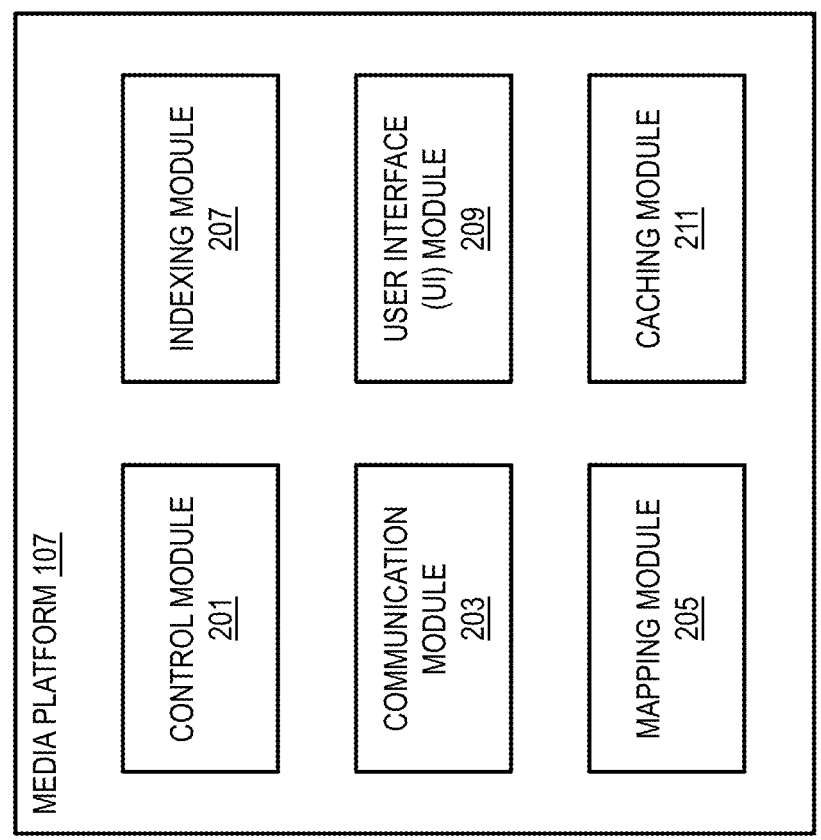
FIG. 2 is a diagram of the components of a mapping platform, according to one embodiment.

FIG. 2 is a diagram of the components of a mapping platform 107, according to one embodiment. By way of example, the mapping platform 107 includes one or more components for generating a virtual environment for controlling one or more electronic devices. It is contemplated that the functions of these components may be combined in one or more components or performed by other components of equivalent functionality. In this embodiment, the mapping platform 107 includes a control module 201, a communication module 203, a mapping module 205, an indexing module 207, a user interface (UI) module 209, and a caching module 211.

The control module 201 executes at least one algorithm for executing functions of the mapping platform 107. For example, the control module 201 may execute an algorithm for processing a query associated with the UE 101 for rendering a user interface depicting a virtual environment (e.g., a home) comprising one or more representations of one or more electronic devices (e.g., a smart television), one or more accessory devices associated with the one or more electronic devices (e.g., a remote control), or a combination thereof. By way of another example, the control module 201 may execute an algorithm to interact with the communication module 203 to communicate among the web server 103, the mapping platform 107, the web client 109, the electronic devices 111, the accessory devices 113, and the third-party service providers 115. The control module 201 may also execute an algorithm to interact with the mapping module 205 to cause a construction of a virtual environment (e.g., a home) including the location infrastructure. The control module 201 also may execute an algorithm to interact with the indexing module 207 to determine location information associated with the electronic devices 111, the accessory devices 113, or a combination thereof in the real-world environment. The control module 201 may also execute an algorithm to interact with the user interface module (UI) 209 to cause a rendering of a user interface depicting a virtual environment that a user can interact with and control using the web client 109 of the UE 101. Further, the control module 201 also may execute an algorithm to interact with the caching module 211 to cause a caching of (a) one or more images of the real-world environment; (b) location information associated with the electronic devices 111, the accessory devices 113, or a combination thereof; (c) other location information associated with at least one user in the real-world environment; (d) the virtual environment, a portion of the virtual environment, or a combination thereof; (e) one or more representations of the electronic devices 111, the accessory devices 113, or a combination thereof; and/or (f) one or queries associated with location information, status information, or a combination thereof associated with the electronic devices 111, the accessory devices 113, or a combination thereof.

The communication module 203 may be used to communicate commands, requests, data, etc. By way of example, the communication module may be used to determine a request from the web client 109 of the UE 101 for a rendering of at least one user interface depicting a virtual environment (e.g., a home) comprising one or more representations of the electronic devices 111 (e.g., a smart television), the accessory devices 113 (e.g., a remote control), or a combination thereof. In one embodiment, the communication module 203, in connection with the user interface module 209, is used to determine location information associated with the electronic devices 111, the accessory devices 113, or a combination thereof as well as other location information associated with at least one user in the real-world environment. The communication module 203, in connection with the indexing module 207, may also be used to determine the status information associated with the electronic devices 111, the accessory devices 113, or a combination thereof. In one embodiment, the communication module 203, in connection with the mapping module 205, may be used determine one or more representations of the electronic devices 111, the accessory devices 113, or a combination thereof supplied by the third-party services providers 115 and/or constructed by one or more users. Further, the communication module 203, in connection with the user interface module 209, may be used to determine one or more interactions with the web client 109 of the UE 101, the virtual environment, the one or more representations of the electronic devices 111, the accessory devices 113, or a combination thereof. In one embodiment, the communication module 203, in connection with the indexing module 207, may also be used to determine one or more queries for at least one location, at least one status, or a combination thereof of the electronic devices 111, the accessory devices 113, or a combination thereof.

The mapping module 205 is used in connection with the user interface module 209 to cause a rendering of at least one user interface depicting a virtual environment comprising one or more representations of the electronic devices 111, the accessory devices 113, or a combination thereof. In one embodiment, the mapping module 205 processes and/or facilitates a processing of one or more images of the real-world environment to cause a construction of a virtual environment. In one embodiment, the mapping module 205 can also provide location infrastructure for the virtual environment including maps that use geometric coordinates, which can be implemented by the mapping module 205 using an indoor GIS system, or a symbolic location coordinate system that is typically based on tag hierarchies (e.g., living room). The mapping module 205 may also be used to process and/or facilitate a processing of one or more images of the real-world environment to cause a determination of the electronic devices 111, the accessory devices 113, or a combination thereof present in the real-world environment as well as their respective locations. The mapping module 205 can then determine one or more representations of the electronic devices 111, the accessory devices 113, or a combination thereof based on one or more substantially physically accurate models (e.g., three-dimensional models provided by one or more third-party service providers 115), one or more abstract models, or a combination thereof. More specifically, in one embodiment, the mapping module 205 causes a rendering of one or more visualizations of one or more control surfaces of the electronic devices 111, the accessory devices 113, or a combination thereof based on the one or more representations. Further, the mapping module 205 may also be used to render the virtual environment, a portion of the virtual environment, or a combination thereof based on one or more locations of at least one user in the real-world environment.

The indexing module 207 is used to determine location information associated with the electronic devices 111, the accessory devices 113, or a combination thereof in the real-world environment. By way of example, the indexing module can determine metadata associated with the electronic devices 111 located in the real-world environment and then create an index that allows a user to perform one or more location queries. Based on the results of the one or more queries, the indexing module 207, in connection with the mapping module 205, can cause a rendering of a virtual environment, or a portion of the virtual environment and the electronic devices 111 that are present in the a target area in the web client 109 of the UE 101. In one embodiment, the indexing module 207 may also be used to determine other location information that indicates one or more locations of at least one user in the real-world environment. Further, as previously discussed, the indexing module 207 may also be used to determine status information associated with the electronic devices 111, the accessory devices 113, or a combination thereof as well as one or more queries for at least one location, at least one status, or a combination thereof of the electronic devices 111, the accessory devices 113, or a combination thereof.

The user interface (UI) module 209 is used to cause a rendering of at least one user interface in the web client 109 of the UE 101 depicting the virtual environment comprising one or more representations of the electronic devices 111, the accessory devices 113, or a combination thereof. In particular, the user interface module 209, in connection with the mapping module 205 and the indexing module 207, may be used to cause a rendering of the one or more representations of the electronic devices 111, the accessory devices 113, or a combination thereof based on the location information associated with the devices. The user interface module 209, in connection with the mapping module 205, may also be used to cause a rendering of one or more visualizations of one or more control surfaces of the electronic devices 111, the accessory devices 113, or a combination thereof. In one embodiment, the user interface module 209, in connection with the communication module 203, is used to determine one or more interactions with the web client 109 of the UE 101, the virtual environment, the one or more representations of the electronic devices 111, the accessory devices 113, or a combination thereof. In particular, the user interface module 209 is also used to determine the one or more interactions with respect to at least one user that (a) is located in the real-world; (b) has remote access to the user interface and the virtual environment; or (c) a combination thereof. Moreover, the interface module 209 is used in connection with the control module 201 to process and/or facilitate a processing of the one or more interactions to cause a selection in the virtual environment and then a controlling of the electronic devices 111, the accessory devices 113, or a combination thereof in the real-world environment.

The caching module 211 is used to cause a caching of the one or more images of the real-world environment. The caching module 211, in connection with the indexing module 207, may be used to cache location information associated with the electronic devices 111, the accessory devices 113, or a combination thereof as well as other location information associated with at least one user in the real-world environment. In addition, the caching module 211, in connection with the mapping module 205, may be used to cache the virtual environment, a portion of the virtual environment, or a combination thereof as well as one or more representations of the electronic devices 111, the accessory devices 113, or a combination thereof. Further, the caching module 211, in connection with the indexing module 207, may be used to cache one or queries associated with location information, status information, or a combination thereof associated with the electronic devices 111, the accessory devices 113, or a combination thereof.

Figure 3:
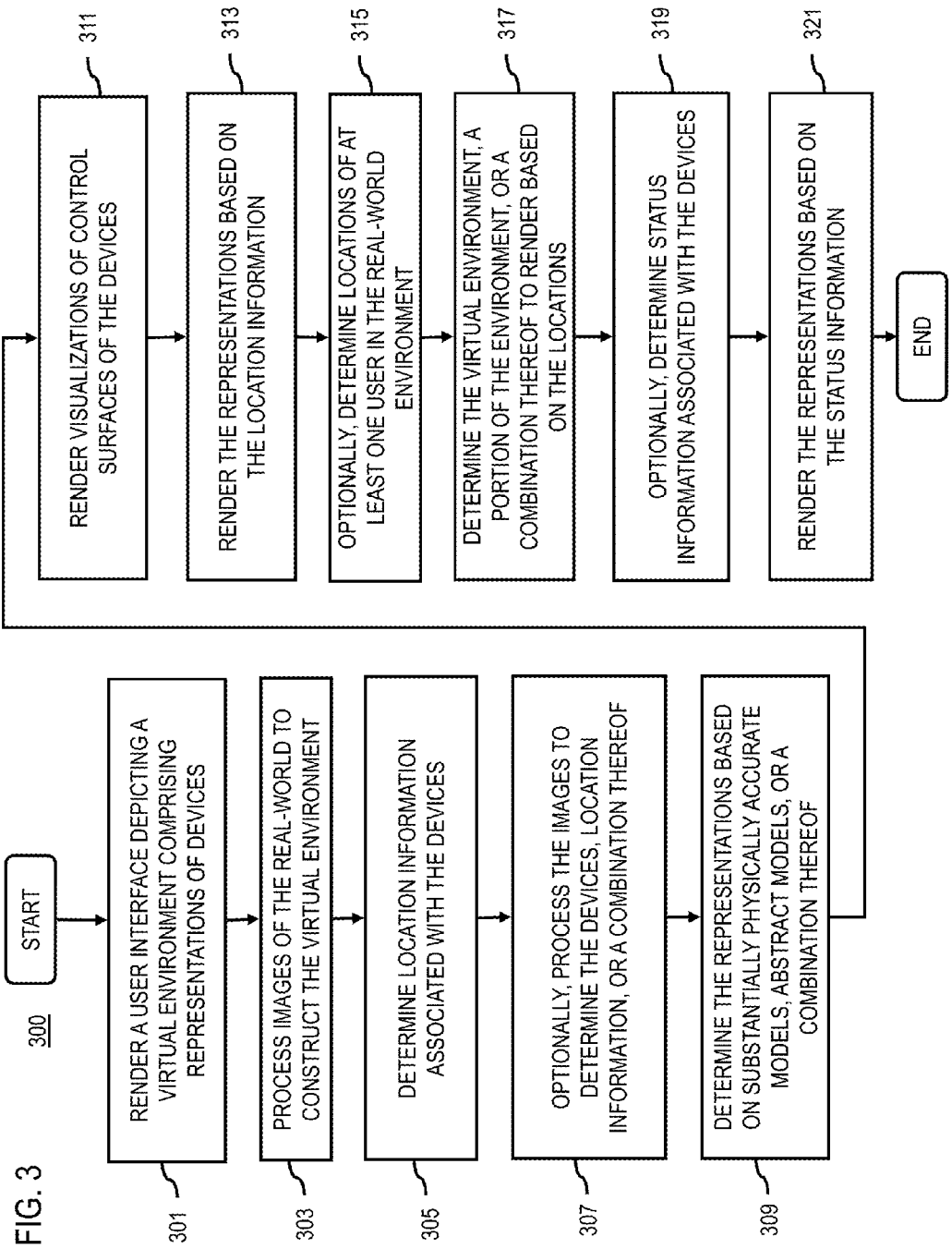
FIGS. 3 and 4 are flowcharts of process for generating a virtual environment for controlling one or more electronic devices, according to one embodiment.
Figure 4:
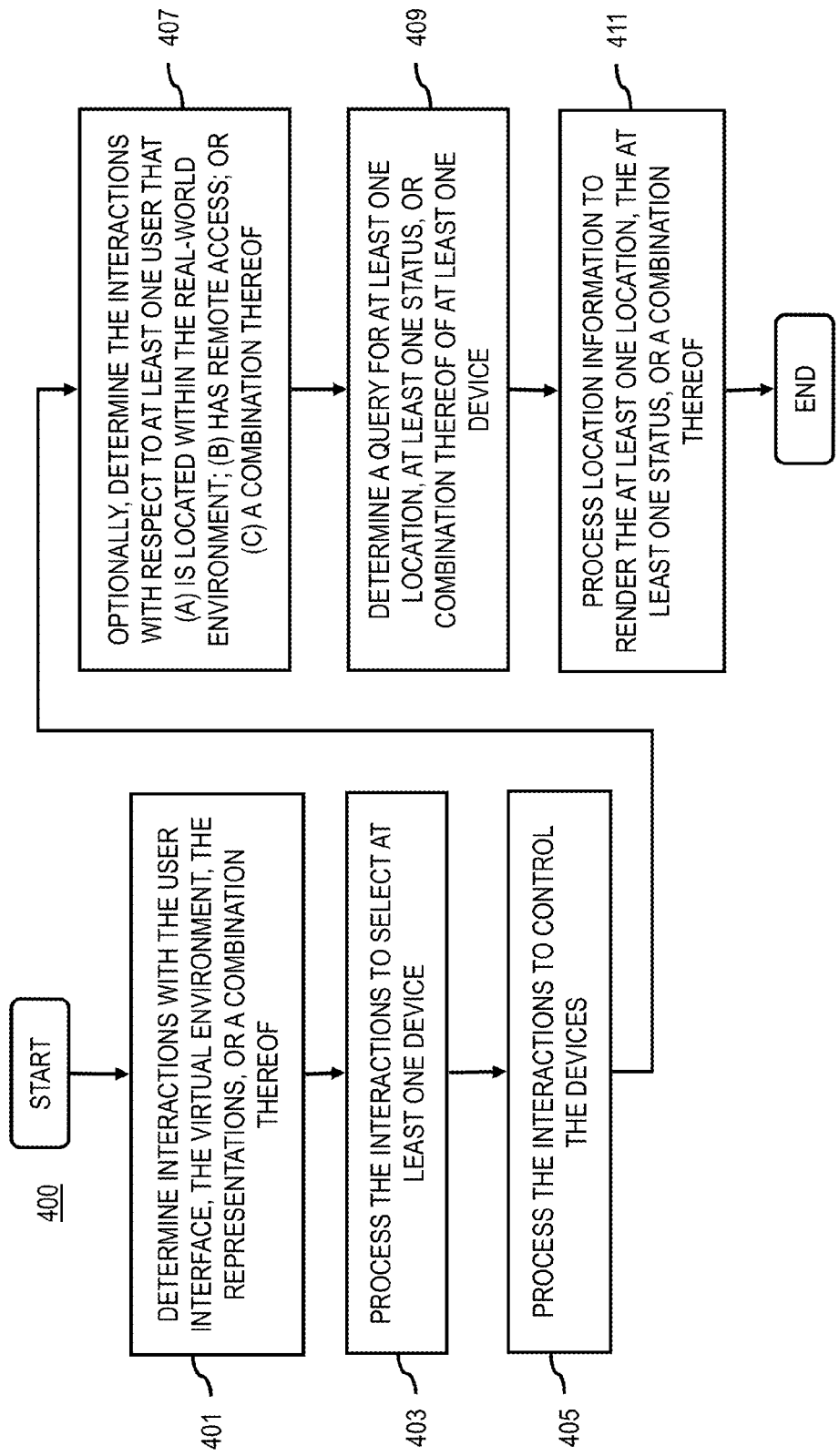
Figure 7:
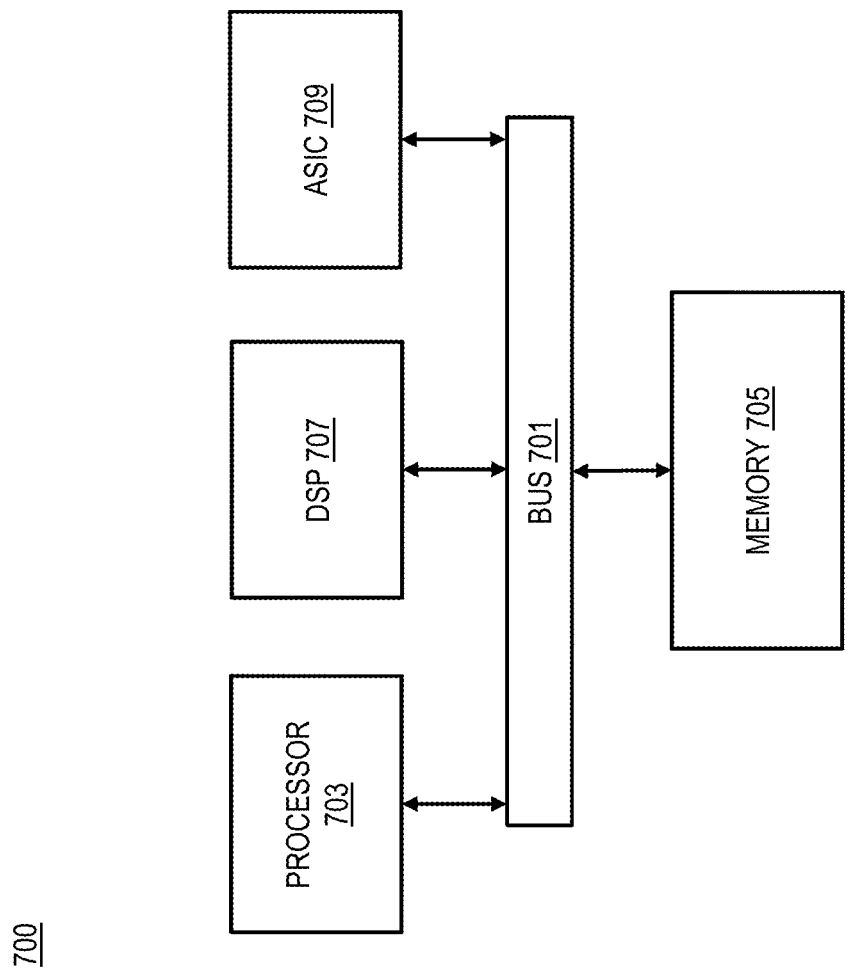
FIG. 7 is a diagram of a chip set that can be used to implement an embodiment of the invention.

FIGS. 3 and 4 are flowcharts of processes for generating a virtual environment for controlling one or more electronic devices, according to one embodiment. FIG. 3 depicts a process 300 of rendering a virtual environment comprising one or more electronic devices, one or more accessory devices, or a combination thereof. In one embodiment, the mapping platform 107 performs the process 300 and is implemented in, for instance, a chip set including a processor and a memory as shown in FIG. 7. In step 301, the mapping platform 107 causes, at least in part, a rendering of a user interface depicting a virtual environment comprising one or more representations of one or more devices, one or more accessory devices associated with the one or more devices, or a combination thereof. By way of example, the user interface can include a mobile device (e.g., a mobile phone) and the virtual environment can include one or more representations of a real-world environment in digital form (e.g., the interior of a home). In one example, the real-world structures (e.g., a living room) are generated in a geographically accurate way. More specifically, the virtual environment can enable one or more users to interact and explore the environments and their workings in ways that may be difficult in real-world situations due to cost, time, resources, etc. In addition, the one or more devices can include a wide variety of electronic devices that provide a networked interface (e.g., smart devices such as consumer electronics, major appliances, HVAC units, etc.). In certain embodiment, devices that do not include a network interface (e.g., a lamp) may also be controlled by utilizing intermediary devices (e.g., one or more networked outlets). By way of example, the one or more accessory devices can include one or more remote controls associated with one or more electronic devices.

In step 303, the mapping platform 107 processes and/or facilitates a processing of one or more images of the real-world environment to cause, at least in part, a construction of the virtual environment. By way of example, the mapping platform 107 can process and/or facilitate a processing of the one or more images (e.g., images taken with a mobile device) in conjunction with one or more three-dimensional construction techniques for generating small-scale virtual environments (e.g., an interior of a home). Such techniques include three-dimensional point cloud models, cylindrical projection models, manually inputting mapping models, or a combination thereof.

In step 305, the mapping platform 107 determines location information associated with the one or more devices, the one or more accessories devices, or a combination thereof in the real-world environment. By way of example, the one or more electronic devices can be associated with metadata that can convey information about the location of the device using either geometric coordinates or symbolic coordinates and can include one or more linked references to a three-dimensional model of the device and one or more accessory devices such as an infrared remote control.

In step 307, the mapping platform 107 optionally processes and/or facilitates a processing of one or more images of the real-world environment to cause, at least in part, a determination of the one or more devices, the one or more accessory devices, the location information, or a combination thereof. In the situation where metadata is unavailable for the one or more electronic devices, the one or more accessory devices, or a combination thereof, the mapping platform 107 can determine the presence and location of one or more electronic devices using one or more visual recognition techniques and/or manual input of brand, model, type, etc. information by one or more users.

In step 309, the mapping platform 107 determines the one or more one or more representations based, at least in part, on one or more substantially physically accurate models, one or more abstract models, or a combination thereof of the one or more devices, the one or more accessory devices, or a combination thereof. In an exemplary embodiment, the one or more representations are based on three-dimensional models provided by one or more device manufactures. In another embodiment, the one or more representations are based on three-dimensional models constructed by one or more users using computer vision technologies. In addition, the one or more representations may be abstract and therefore not tied to the physicality of the particular device. More specifically, the one or more abstract representations may be more streamlined than the actual remote control and only include the most essential elements to control the corresponding one or more electronic devices.

In step 311, the mapping platform 107 causes, at least in part, a rendering of one or more visualizations of one or more control surfaces of the at least one of the one or more devices, the one or more accessory devices, or a combination thereof. In one example, if a user selects a particular device (e.g., a television) the user can determine one or more visualizations of one or more control surfaces of the device (e.g., power, menu, channel, etc.) or one or more visualizations of one or more control surfaces of the associated remote control (e.g., volume, channel, play, pause, etc.). If the user selects to interact with the one or more visualizations of the one or more controls surfaces of the remote control, the mapping platform 107 causes a rendering of the three-dimensional model of the remote control. More specifically, because all of the keys of the virtual remote control have already been mapped by the manufacturer or the mapping platform 107 to the same actions the physical remote is able to perform, the user is able to press play on the virtual remote control and a video will start playing on the corresponding television in the real-world environment. In other words, the mapping platform 107 can also render the representations based, at least in part, on the location information (step 313).

In step 315, the mapping platform 107 optionally determines other location information that indicates one or more locations of at least one user in the real-world environment. By way of example, the at least one user may be located in the living room or a bedroom. In step 317, the mapping platform determines the virtual environment, a portion of the virtual environment, or a combination thereof to render in the user interface based, at least in part, on the other location information. In one use case, the mapping platform 107 generates a substantially real-time one-to-one relationship between the location of the at least one user in the real-world environment and the location of the user in the virtual environment. In contrast, the mapping platform 107 can also allow the at least one user to use the user interface to jump from one location to another regardless of the at least one user's location (e.g., turning off a television left on another floor).

In step 319, the mapping platform 107 optionally determines status information associated with the one or more devices, the one or more accessory devices, or a combination thereof. For example, the status information can include whether one or more electronic devices (e.g., a television) are on or off, playing a video or regular television, etc. In step 321, the mapping platform 107 causes, at least in part, a rendering of the one or more representations based, at least in part, on the status information. In one use case, the mapping platform 107 can determine to render a symbol (e.g., a red light or green light) to represent the on or off status of the electronic device (e.g., a television). Alternatively, the mapping platform 107 can determine to render a portion of the content being simultaneously rendered on the electronic device in the real-world environment.

FIG. 4 depicts a process 400 of determining one or more interactions and/or one or more queries related to one or more electronic devices, one or more accessory devices, or a combination thereof depicted in a virtual environment. In one embodiment, the mapping platform 107 performs the process 400 and is implemented in, for instance, a chip set including a processor and a memory as shown in FIG. 7. In step 401, the mapping platform 107 determines one or more interactions with the user interface, the virtual environment, the one or more representations, or a combination thereof. By way of example, the one or more interactions can include manipulating a web client (e.g., a web browser) on a mobile device (e.g., a mobile phone) in order to select and then control one or more electronic devices (e.g., a television), one or more accessory devices (e.g., a remote control), or a combination thereof in the real-world environment (e.g., an interior of a home) as depicted in the virtual environment.

In step 403, the mapping platform 107 processes and/or facilitates a processing of the one or more interactions to determine a selection of at least one of the one or more devices, the one or more accessory devices, or a combination thereof. In step 405, the mapping platform 107 processes and/or facilitates a processing of the one or more interactions to cause, at least in part, a controlling of the one or more devices, the one or more accessory devices, or a combination thereof. As previously discussed, the one the one or more interactions can include manipulating a web client (e.g., a web browser) on a mobile device (e.g., a mobile phone) in order to select and then control one or more electronic devices (e.g., a television), one or more accessory devices (e.g., a remote control), or a combination thereof depicted in the virtual environment (e.g., an interior of a home). Moreover, it is contemplated that in most homes there are a wide variety of electronic devices (e.g., smart devices such as consumer electronics, major appliances, HVAC units, etc.) among which a user can determine to select and to control with the mobile device.

In step 407, the mapping platform 107 optionally determines the one or more interactions with respect to at least one user that (a) is located within the real-world; (b) has a remote access to the user interface and the virtual environment; or (c) a combination thereof. By way of example, a user at work one the evening may determine for safety purposes to select and then control one or more electronic devices (e.g., a television and/or one or more lights) in the living room of his or her home in order to make it appear to others that the user is present. In another use case, the user at work may determine to select and then control a television in his or her home in order to record a program so that he or she can watch it at a later time (e.g., when the user returns home from work).

In step 409, the mapping platform 107 determines one or more queries for at least one location, at least one status, or a combination thereof of at least one of the one or more devices, the one or more accessory devices, or a combination thereof. As previously discussed, the one or more electronic devices are often associated with metadata that can convey information about the location of the electronic device using either geometric coordinates or symbolic coordinates. As a result, the mapping platform 107 is able to determine the metadata for each electronic device and create an index that allows the mapping platform 107 to later perform one or more location queries. By way of example, a user that hears sound emanating from another room may want to know "which room has the television on". Based on the indexed information, the mapping platform 107 can be used to determine the status of the one or more devices (e.g., a television on or off) and then determine which room(s) the one or more devices are located in.

In step 411, the mapping platform 107 processes and/or facilitates a processing of the location information to cause, at least in part, a rendering of the at least one location, the at least one status, or a combination thereof in the user interface. As previously discussed, based on the indexed information the mapping platform 107 can render the virtual environment, a portion of the virtual environment (e.g., a living room), or a combination thereof in the user interface where the electronic device (e.g., the left on television) can be found in the real-world environment. Once the user determines the location of the television, he or she can manipulate the user interface to turn the television off or he or she can turn the television off manually if it is conveniently located nearby. It is also contemplated that the mapping platform 107 can also render the quadrant of the virtual environment that the electronic device is located in if the indoor GIS used to generate the virtual environment is accurate enough.

Figure 5:
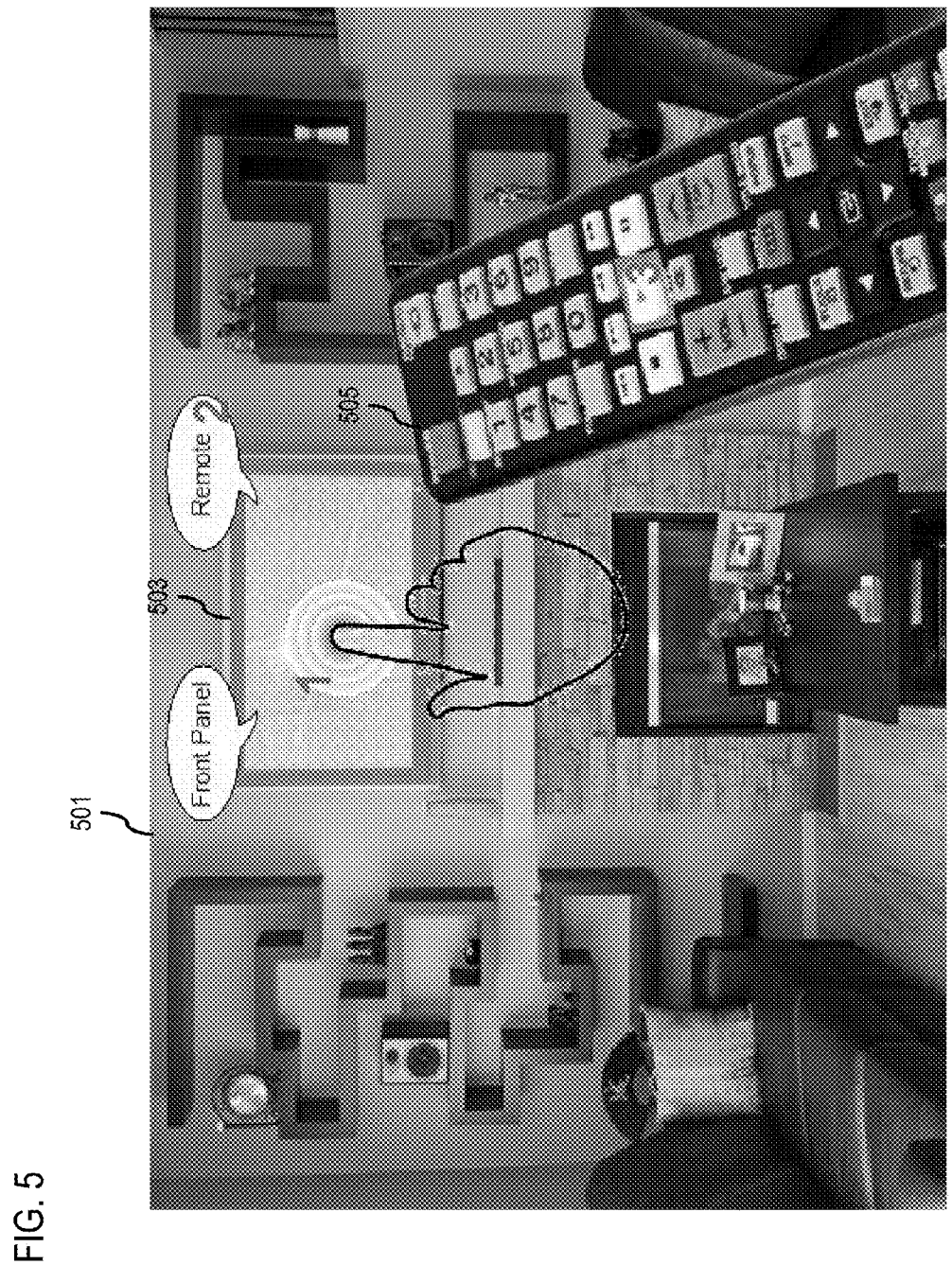
FIG. 5 is a diagram of an example user interface utilized in the processes of FIGS. 3 and 4, according to various embodiments.

FIG. 5 is a diagram of an example user interface utilized in the processes of FIGS. 3 and 4, according to various embodiments. As shown, the example user interface of FIG. 5 includes one or more user interface elements and/or functionalities created and/or modified based, at least in part, on information, data, and/or signals resulting from the processes (e.g., processes 300 and 400) described with respect to FIGS. 3 and 4. More specifically, FIG. 5 illustrates at least one interaction with a user interface (e.g., interface 501) depicting an example of a virtual environment that represents a real-world environment (e.g., a living room) comprising one or more representations of one or more electronic devices (e.g., a television 503), one or more accessory devices (e.g., a remote control 505), or a combination thereof. In addition, the interface 501 also depicts one or more visualizations of one or more control surfaces (e.g., the remote control 505). By way of example, when a user explores the virtual environment and reaches the living room as depicted in interface 501, the user can determine the presence of a television 503 (e.g., a DLNA/UPnP enabled set) based on location information associated with the television 503. More specifically, once the user enters the living room, whether physically or virtually, the system 100 causes a rendering of a three-dimensional model of the television 503 and an associated remote control 505 in the virtual environment as depicted in interface 501. A user can then determine to interact with the television 503. As a result, the user is presented with two options: to control the television 503 by using the control surfaces of the television 503 or by using the control surfaces of the remote control 505. If the user chooses the remote control 505, a three-dimensional model of the remote control 505 is also displayed as depicted in interface 501. As previously discussed, all of the control surfaces (e.g., keys) are mapped by the manufacturer or the system 100 to the same actions the physical remote control is able to perform. As a result, once the user presses play on the remote control 505, a video can start playing on the physical television represented by the television 503.

The processes described herein for generating a virtual environment for controlling one or more electronic devices may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
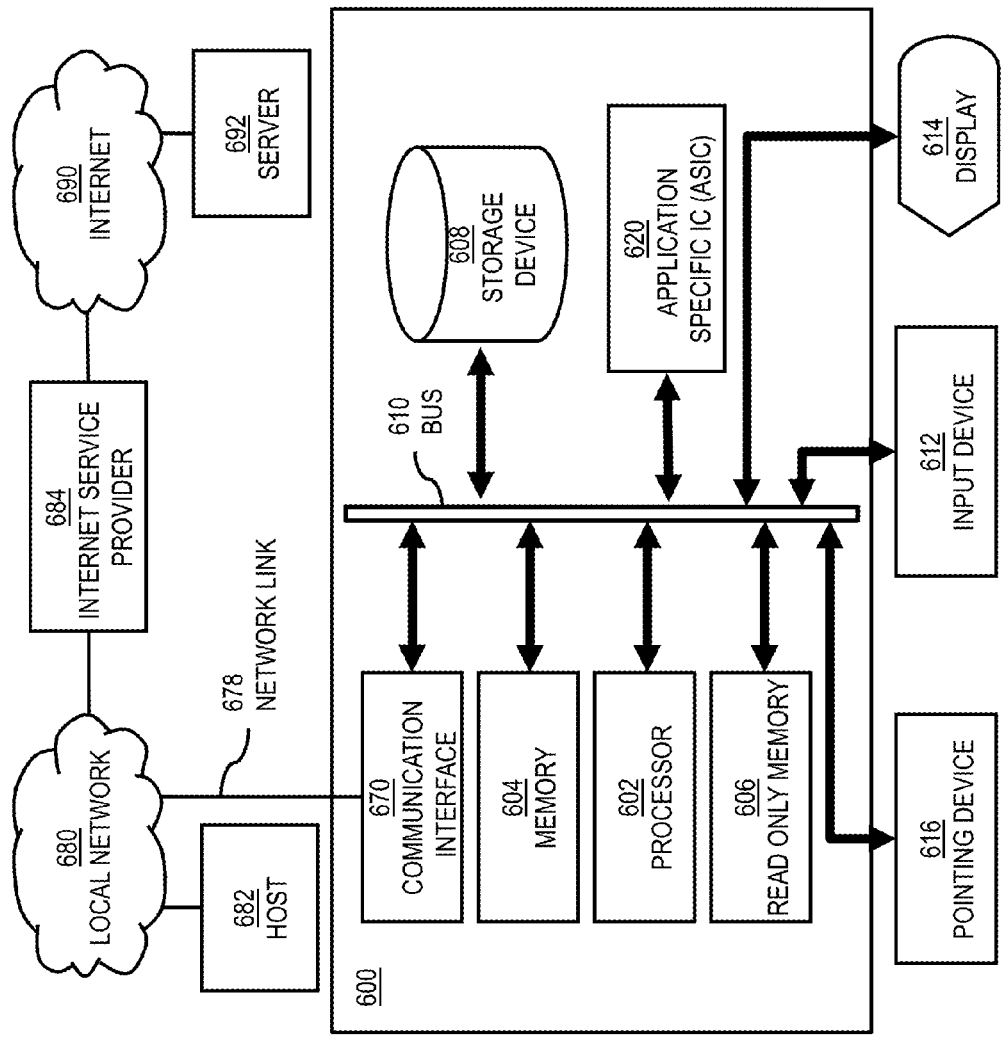
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate a virtual environment for controlling one or more electronic devices as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating a virtual environment for controlling one or more electronic devices.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate a virtual environment for controlling one or more electronic devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating a virtual environment for controlling one or more electronic devices. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating a virtual environment for controlling one or more electronic devices, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating a virtual environment for controlling one or more electronic devices to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to generate a virtual environment for controlling one or more electronic devices as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating a virtual environment for controlling one or more electronic devices.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate a virtual environment for controlling one or more electronic devices. The memory 705 also stores the data associated with or generated by the execution of the inventive steps.

Figure 8:
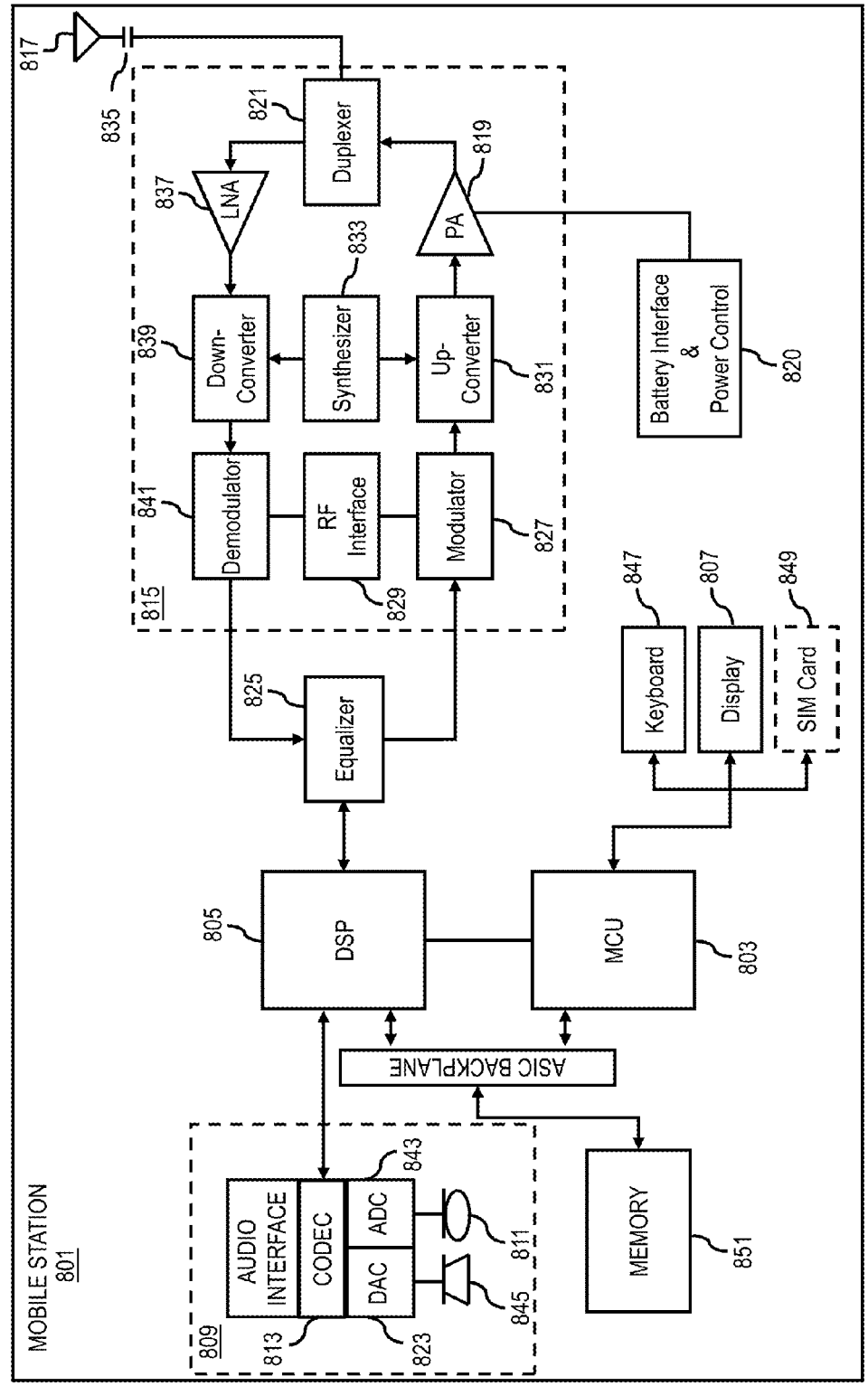
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating a virtual environment for controlling one or more electronic devices. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating a virtual environment for controlling one or more electronic devices. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate a virtual environment for controlling one or more electronic devices. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by an apparatus via a data network, a wireless communication network, or a combination thereof, data associated with at least one location and at least one status of one or more devices, one or more accessory devices associated with the one or more devices, or a combination thereof that are located within an interior space of a real-world environment, wherein the apparatus is located outside of the interior space;
   processing, by the apparatus, one or more images of the interior space of the real-world environment to initiate a construction of a virtual environment representing the interior space;
   initiating, by the apparatus, a rendering of a user interface geographically accurately depicting one or more representations of the one or more devices, the one or more accessory devices, or a combination thereof within the virtual environment based on the at least one location within the interior space;
   initiating, by the apparatus, a rendering of one or more representations of at least a part of one or more control surfaces associated with the one or more devices, the one or more accessory devices, or a combination thereof in the user interface;
   determining, by the apparatus, one or more interactions with the user interface, the virtual environment, the one or more representations, or a combination thereof; and
   processing, by the apparatus, the one or more interactions to initiate a controlling in the real-world environment of the one or more devices, the one or more accessory devices, or a combination thereof based on a control represented through the one or more control surfaces.

2. A method of claim 1, further comprising:
   determining one or more locations of at least one user in the real-world environment; and
   determining a view of the virtual environment, a portion of the virtual environment, or a combination thereof rendered in the user interface based, at least in part, on the one or more locations of the at least one user,
   wherein the at least one location includes geometric coordinates of the one or more devices, the one or more accessory devices, or a combination thereof.

3. A method of claim 1, further comprising:
   processing the one or more images of the interior space of the real-world environment to determine the one or more devices, the one or more accessory devices, the at least one location, or a combination thereof,
   wherein the one or more interactions on the user interface interact with one or more of the control surfaces associated with the one or more accessory devices and remotely control the one or more devices.

4. A method of claim 1, wherein at least one of the one or more devices and the one or more accessory devices is an electronic device, and wherein the at least one location is determined using an indoor geographic information system.

5. A method of claim 1,
   wherein the data associated with the at least one location and at least one status is based on metadata associated with the one or more devices, the one or more accessory devices, or a combination thereof.

6. A method of claim 1, further comprising:
   determining the one or more interactions with respect to at least one user that (a) is located within the real-world; (b) has a remote access to the user interface and the virtual environment; or (c) a combination thereof,
   wherein the apparatus is a server communicating with the one or more devices, the one or more accessory devices, or a combination thereof via the data network, the wireless communication network, or a combination thereof.

7. A method of claim 1, further comprising:
   determining the one or more representations based, at least in part, on one or more substantially physically accurate models, one or more abstract models, or a combination thereof of the one or more devices, the one or more accessory devices, or a combination thereof, wherein the one or more representations are received from one or more device manufacturers via a communication network, and wherein the interior space is a room, and the apparatus is located in another room.

8. A method of claim 1, further comprising:

processing the controlling in the real-world environment of the one or more devices, the one or more accessory devices, or a combination thereof to play media content thereon;

initiating a rendering of the media content on at least one device of the one or more devices, the one or more accessory devices, or a combination thereof simultaneously with a rendering of the user interface including the at least one device rendering the media content, wherein the user interface is rendered on a device outside of the interior space.

9. A method of claim 1, further comprising:

determining the status information associated with the one or more devices, the one or more accessory devices, or a combination thereof; and initiating a rendering of the one or more representations based, at least in part, on the status information, wherein the status information includes an on or off device status, a video or television program playing status, or a combination thereof.

10. A method of claim 1, further comprising:

generating the virtual environment to represent the interior space using one or more three-dimensional point cloud models, cylindrical projection models, a manual input of mapping models, or a combination thereof.

11. An apparatus comprising:

at least one processor; and at least one memory including computer program code for one or more programs;

the at least one memory and the computer program code configured to, with the at least one processor, cause the apparatus to perform at least the following:

receive, via a data network, a wireless communication network, or a combination thereof, data associated with at least one location and at least one status of one or more devices, one or more accessory devices associated with the one or more devices, or a combination thereof that are located within an interior space of a real-world environment, wherein the apparatus is located outside of the interior space;

process one or more images of the interior space of the real-world environment to initiate a construction of a virtual environment representing the interior space;

initiate a rendering of a user interface geographically accurately depicting one or more representations of the one or more devices, the one or more accessory devices, or a combination thereof within the virtual environment based on the at least one location within the interior space, initiate a rendering of one or more representations of at least a part of one or more control surfaces associated with the one or more devices, the one or more accessory devices, or a combination thereof in the user interface, determine one or more interactions with the user interface, the virtual environment, the one or more representations, or a combination thereof, and process the one or more interactions to initiate a controlling in the real-world environment of the one or more devices, the one or more accessory devices, or a combination thereof based on a control represented through the one or more control surfaces.

12. An apparatus of claim 11, wherein the apparatus is further caused to:

determine one or more locations of at least one user in the real-world environment, and determine a view of the virtual environment, a portion of the virtual environment, or a combination thereof rendered in the user interface based, at least in part, on the one or more locations of the at least one user.

13. An apparatus of claim 11, wherein the apparatus is further caused to:

process one or more images of the interior space of the real-world environment to determine the one or more devices, the one or more accessory devices, the at least one location, or a combination thereof.

14. An apparatus of claim 11, wherein at least one of the one or more devices and the one or more accessory devices is an electronic device.

15. An apparatus of claim 11, wherein the data associated with the at least one location and at least one status is based on metadata associated with the one or more devices, the one or more accessory devices, or combination thereof.

16. An apparatus of claim 11, wherein the apparatus is further caused to:

determine the one or more interactions with respect to at least one user that (a) is located within the real-world; (b) has a remote access to the user interface and the virtual environment; or (c) a combination thereof.

17. An apparatus of claim 11, wherein the apparatus is further caused to:

determine the one or more representations based, at least in part, on one or more substantially physically accurate models, one or more abstract models, or a combination thereof of the one or more devices, the one or more accessory devices, or a combination thereof, wherein the one or more representations are received from one or more device manufacturers via a communication network.

18. An apparatus of claim 11, wherein the apparatus is further caused to:

process the controlling in the real-world environment of the one or more devices, the one or more accessory devices, or a combination thereof to play media content thereon, initiate a rendering of the media content on at least one device of the one or more devices, the one or more accessory devices, or a combination thereof simultaneously with a rendering of the user interface including the at least one device rendering the media content, wherein the user interface is rendered on a device outside of the interior space.

19. An apparatus of claim 11, wherein the apparatus is further caused to:

determine status information associated with the one or more devices, the one or more accessory devices, or a combination thereof, and initiate a rendering of the one or more representations based, at least in part, on the status information.

20. An apparatus of claim 11, wherein the apparatus is further caused to:

generate the virtual environment to represent the interior space using one or more three-dimensional point cloud models, cylindrical projection models, a manual input of mapping models, or a combination thereof.

* * * * *